Feb. 6, 1934.   J. A. MAURER, JR   1,946,088
CONDENSING LENS SYSTEM FOR MOTION PICTURE PROJECTION
Original Filed Jan. 4, 1924   3 Sheets-Sheet 1
*Fig. 1*
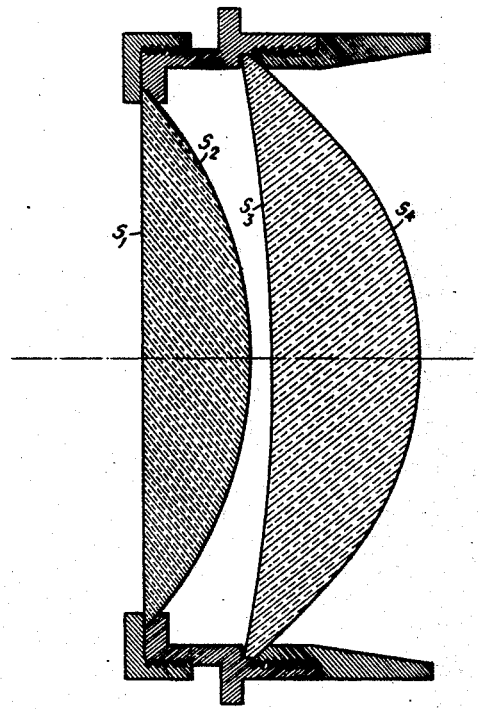
*Fig. 2*       *Fig. 3*       *Fig. 4*
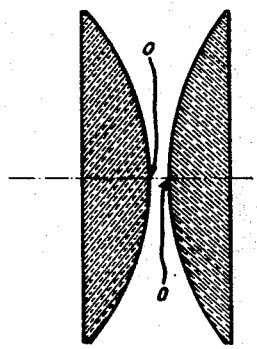 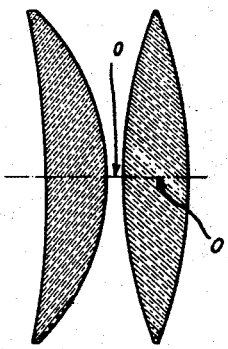 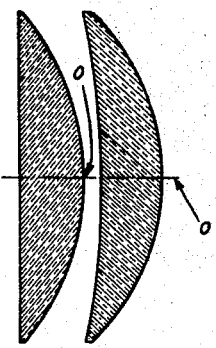
*Fig. 5a*                     *Fig. 5b*
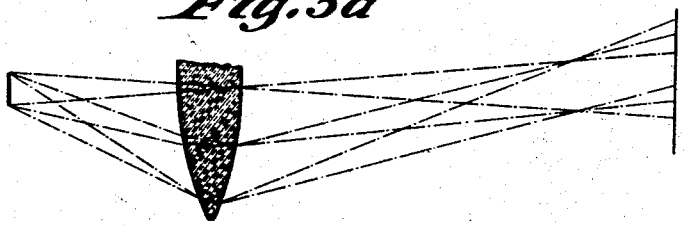 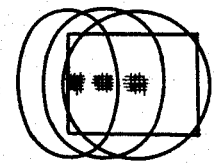
INVENTOR
JOHN A. MAURER JR.
BY
ATTORNEY Feb. 6, 1934.   J. A. MAURER, JR   1,946,088
CONDENSING LENS SYSTEM FOR MOTION PICTURE PROJECTION
Original Filed Jan. 4, 1924   3 Sheets-Sheet 2
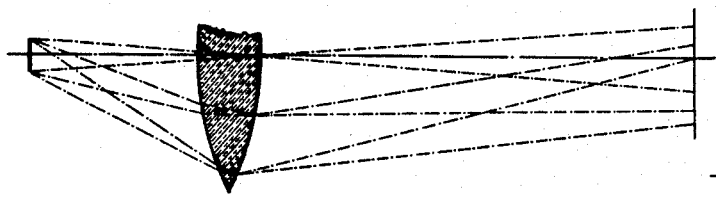
Fig. 6a
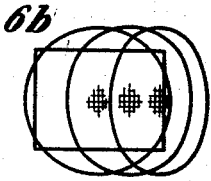
Fig. 6b
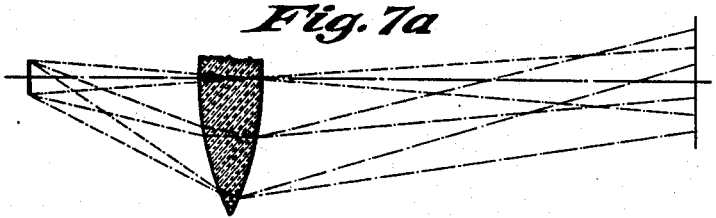
Fig. 7a
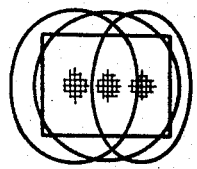
Fig. 7b
Fig. 8
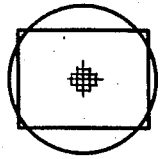
a
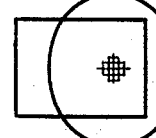
b
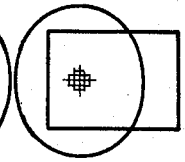
c
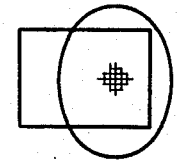
d
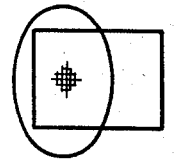
e
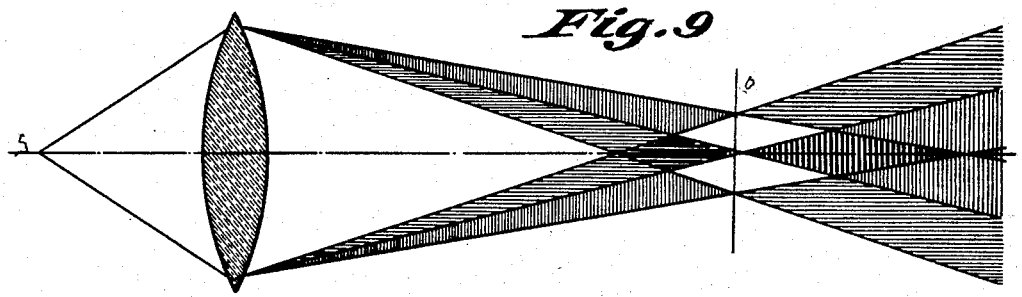
Fig. 9
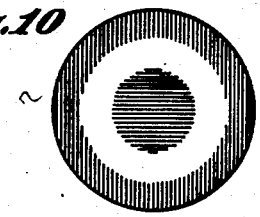
Fig. 10
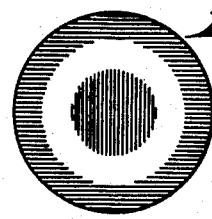
Fig. 11
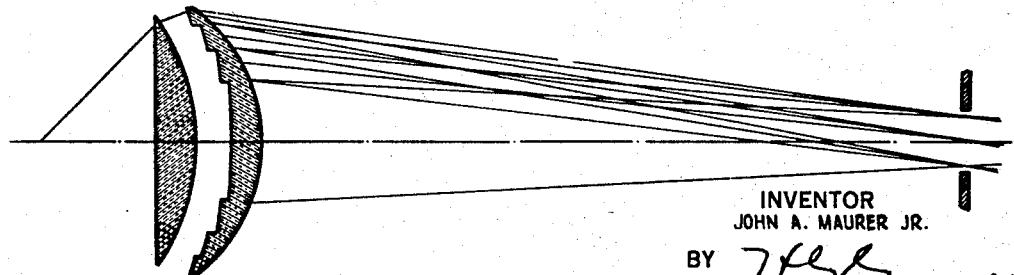
Fig. 17
INVENTOR
JOHN A. MAURER JR.
BY
ATTORNEY Feb. 6, 1934.  J. A. MAURER, JR  1,946,088
CONDENSING LENS SYSTEM FOR MOTION PICTURE PROJECTION
Original Filed Jan. 4, 1924   3 Sheets-Sheet 3
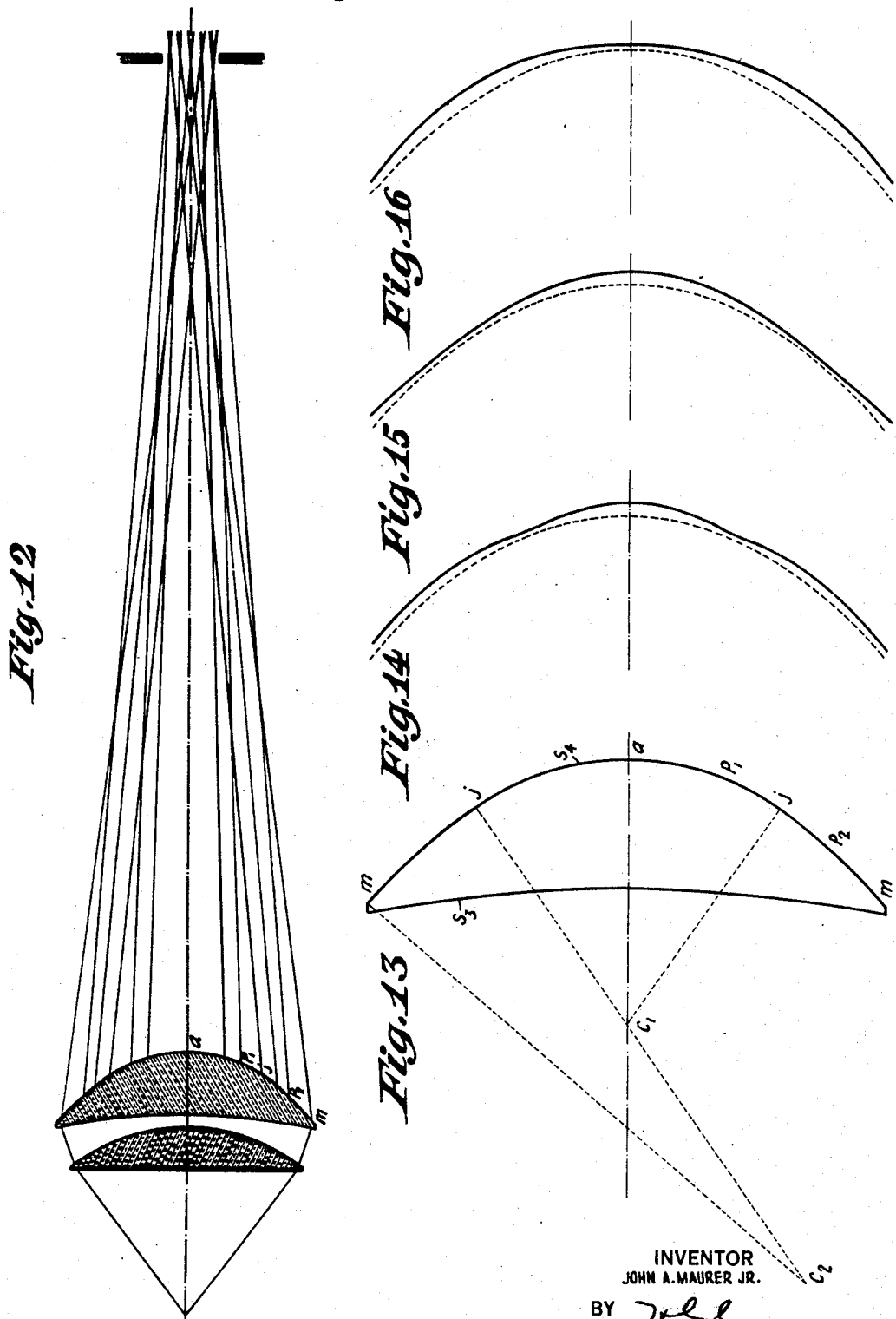
INVENTOR
JOHN A. MAURER JR.
BY
ATTORNEY Patented Feb. 6, 1934

1,946,088

UNITED STATES PATENT OFFICE 1,946,088

CONDENSING LENS SYSTEM FOR MOTION PICTURE PROJECTION

John A. Maurer, Jr., New York, N. Y., assignor to Radio Corporation of America, a corporation of Delaware Refiling for abandoned application Serial No. 684,391, January 4, 1924. This application July 24, 1930. Serial No. 470,371

5 Claims. (Cl. 88—24)

My invention relates to lenses such as those utilized to concentrate light upon an illuminated surface, and has for its principal object the provision of an improved condenser lens whereby light from a suitable source may be concentrated uniformly upon a surface which it is desired to illuminate.

Another object of my invention is to increase the efficiency of the optical system employed in the projection of motion pictures to the end that a more highly illuminated picture may be projected without increasing the amount of energy supplied to the light source.

Another object of my invention is to produce a light beam of sufficiently small diameter for motion picture purposes which is of uniform intensity at the exposed area of the picture.

Another object of my invention is to produce such a beam of small diameter which is of uniform color value at exposed area of the picture.

Another object of my invention is to accomplish the foregoing by a lens system located at a considerable distance from the film so that the light beam passing thru the aperture of motion picture projector is contained within a relatively narrow angle whereby all or nearly all of the light therefrom will fall within the projection lens.

Another object of my invention is to provide such a condensing system of large angular aperture.

Other and ancillary objects of the invention will hereinafter appear to those skilled in the art upon consideration of this specification and of the drawings appended hereto.

The light gathering power of a condenser depends upon its angular aperture, which is determined by the distance from the light source to the nearest lens of the system and the effective diameter of that lens. With the types of condenser now in use, namely, those made up of lenses having spherical surfaces, and which therefore have positive spherical aberration, and those in which there is one aspheric surface of such form that the condenser as a whole is free from spherical aberration, the attempt to construct a condenser having an angular aperture of more than about 60 degrees results in either an uneven or a discolored illumination if the spot is kept small, and if the size of the spot is increased sufficiently to obtain an even illumination so much light is thereby wasted that the advantage of the additional angular aperture is lost. It is fairly easy to design a condenser of wide angular aperture, but in order to gain the full advantage in efficiency from such a system it is necessary that the light be so distributed that it will form a small spot of even intensity and color throughout.

In accordance with my invention the result is effected by the provision of a condenser lens having a plurality of complementary spherical and chromatic aberration zones.

My invention will be better understood when considered in connection with the accompanying drawings and its scope will be pointed out in the appended claims.

Figure 1 shows a section through the optical axis of the preferred form of my invention in its complete assembly.

Figures 2, 3, and 4 show various ways of assembling the lenses of a condenser and serve to show a few of the points which must be considered in designing a condenser of wide angular aperture.

Figures 5 to 11 inclusive illustrate the principal difficulties in obtaining an even illumination and how they are overcome.

Figure 12 shows the action of the preferred form of my invention upon light rays from a point of the source.

Figure 13 shows the geometrical construction of the converging lens of the preferred form of my invention, its convex surface being representative of a new type of lens surface which I have invented to simplify the carrying out of my main invention.

Figures 14, 15, and 16 show other forms of lens surface which might be used in place of that shown in Figure 13. Figure 17 shows other forms of condenser lens constructed in accordance with my invention.

It is convenient in this discussion to take up the various problems in the order in which they must be solved in the actual designing and construction of the condenser.

Referring to Figure 1, the preferred form of my invention, the light is supposed to pass through the lenses from left to right. The first surface, $S_1$ is plane, though for certain purposes it might be desirable to make it spherical concave.

The second, $S_2$ is spherical convex; $S_3$ is spherical concave; and $S_4$ is a convex aspheric surface of the type more completely described in connection with Figure 13. The principal obstacle to an increase in the angular aperture of a condenser is the tendency of the lens next the light source, referred to in this discussion as the collector lens, to be broken by the unequal expansion caused by the radiated heat. This tendency decreases as the lens is made thinner.

In Figure 2, which shows the most common way of assembling the lenses of a condenser, it will be noted that the collector lens is of the same diameter as the second lens, herein referred to as the converging lens. Since in practice the light source is always considerably closer to the collector lens than its principal focus the rays always diverge between the two lenses, with the result that those passing through the marginal zone of the collector lens fall outside the converging lens and are lost. Therefore the marginal part of the lens serves no useful purpose, while carrying the curve out to the full diameter adds greatly to the thickness of glass necessary in the central portions. By reducing the diameter of the collector lens to its useful aperture, as has been done in the system of Figure 1, it is made much thinner and therefore the light source can be brought much closer to it with consequent increase in the angular aperture. This, however, requires an increase in the refracting power of the system in order to bring the rays to a focus at the same distance from the condenser as before. This additional refracting power cannot well be placed in the collector lens, since this would make it thicker. Neither can it, with the types of condenser now in use be placed in the converging lens, because doing so would increase the spherical and chromatic aberrations to such an extent as to seriously injure the illumination, as before stated. But when this is provided against by the means hereinafter described, the converging lens may be given as short a focal length as is desirable, even to the extent of transferring to it a part of the refracting power of the collector lens, making that lens still thinner.

The second important obstacle to an increase in the angular aperture is the tendency for the magnifying power of the system to be increased to such an extent that the magnified image of the light source, which always has considerable area, becomes larger than the smallest diameter to which it is desired to bring the beam. This can only be overcome by so assembling the lenses that their optical centers are as far as possible away from the light source. In Figures 2, 3, and 4 the optical centers of the individual lenses are indicated at o—o. It will be seen that in the two common assemblies shown in Figures 2 and 3 the optical centers lie much nearer the light source than in the assembly shown in Figure 4, and consequently their magnifying power is higher. This latter assembly is not practical with spherical lenses because it increases spherical aberration, but in any construction in which spherical aberration is eliminated or controlled it is ideal. By making the converging lens a deeper meniscus the magnifying power of the system may be reduced as much as is desirable, so that it is no longer an obstacle to the increase of angular aperture.

Having thus set forth the means by which the angular aperture of a condenser may be increased, I now describe how I obtain even illumination from such a condenser and thus make its increased light available in practice.

There are two principal causes of unevenness of illumination, the unevenness of brilliancy existing in the light source itself, and the unevenness resulting from the aberrations of the lenses. The light source with the electric arc consists of a bright disc with a less bright spot in the center, caused by the core of the carbon. The light passing through each individual point of any of the surfaces of the condenser falls upon the film in the form of an image of the light source, as may readily be observed experimentally if all the rays but those passing through one point are masked out. The appearance is that represented in the parts of Figure 8 as well as in Figures 5, 6, and 7, parts B. How it occurs is clearly shown in Figures 5, 6, and 7, parts A. The spot of light which illuminates the aperture of the projector is made up of these innumerable overlapping images. In a condenser corrected for spherical aberration there is a plane intersecting the beam of light where all of these images unite to form the main image, which is the only one visible in the beam as a whole. If this image falls at or near the film plane the dark spot in the center will appear on the screen, which is highly undesirable. In order to avoid this it must be arranged that where the images cross the film plane they are out of register with each other enough that the bright edge of one will fall over the dark center of another, so that the result as a whole is a uniform blending of the light. This may be accomplished with a spherically corrected condenser merely by focusing the main image a considerable distance on one side of the film plane, but while this meets all requirements as to evenness of brilliancy, it has an unsatisfactory color distribution, as will be explained in connection with Figure 9, and this prevents it from being used with a large angular aperture.

The same decentering of part of the images at the film plane occurs with the ordinary uncorrected form of condenser because of the positive spherical aberration in it, but the difficulty with this type is that the decentering is not regular, becoming entirely too great in the marginal zones. In order to obtain even illumination with efficiency the decentering of the images must in all zones be limited to that amount which is just sufficient to cause the disappearance of the dark spot, i. e. the aberrations must be complementary. In practice the best result is obtained when none of the images are decentered far enough to fall entirely on one side of the optical axis at the film plane. To accomplish this in a condenser of wide angular aperture an aspheric surface must be used at some point in the construction. If this surface is ground so as to give the condenser a light uniform positive spherical aberration from center to margin the image distribution will be as shown in Figure 5. Part A shows the paths of the image-carrying light bundles from the light source, L, through the condenser, here represented by a single double convex lens, to the film plane, F. Part B shows the positions occupied by the images on the aperture plate of the projector, the film space being shown by the rectangle. As an alternative the system might be made to have a slight negative spherical aberration, which would give the image distribution shown in Figure 6, parts A and B. Each of these methods gives a satisfactory result as far as evenness of brilliancy is concerned, but neither is satisfactory as to color distribution.

Figure 7, parts A and B shows the simplest form of my invention, which consists of a condenser of such construction that it distributes the images from points on one side of the optical axis at the lens on both sides of the optical axis at the film plane, as is shown. This construction eliminates the dark spot as effectively as the others, while it permits of a wide angular aperture without causing an unsatisfactory color distribution. Figure 8 is introduced at this point to show the actual distribution of the images with the preferred form of my condenser. In connection with this figure it may be remarked that the images through the outer zones of the condenser are distorted, as here illustrated, because of the angle at which the crater sets with reference to this part of the lens. The parts of Figure 8 will be identified later in connection with Figure 13.

The unevenness present in the light source is, as has been stated, principally an unevenness of brilliancy. The most troublesome unevenness caused by the aberrations of the lenses is, on the other hand, an unevenness of color value. Chromatic aberration is primarily responsible for this, but if spherical aberration causes an improper distribution of the bundles of light from the various zones of the condenser the effect becomes much more noticeable than with a spherically correct system, though it is present even with the latter. The power of the spherical aberration to control the massing of the colored light in different parts of the spot that is made use of in my invention to cause the color from one zone of the condenser to balance that from another zone, or to be complementary thereto, producing a spot all parts of which are white. In Figures 9, 10, and 11, which illustrate the way in which discoloration of the light takes place, ruling is used to show color in the light beam, vertical ruling signifying red and horizontal ruling blue. In this connection it must be understood that for the sake of simplifying the drawings "red" is used to stand for the entire red end of the spectrum, including the colors red, orange, and yellow, while "blue" stands for green, blue, and violet. As may be seen in Figure 9, the blue, being the more refrangible color, is brought closer to the optical axis is the part of the beam between the condenser and the focal point while for the same reason it crosses the optical axis sooner than the red and in the part of the beam beyond the focus is on the outside. It is also observed that at the focal point itself there is comparative freedom from color, this being, however, of no practical value since the image cannot be focused at the film plane for reasons previously given. The practical result of what is shown in Figure 9 is that the illumination from any zone of the condenser which has its focus beyond the film plane carries a predominance of blue in its center and of red at its margin, the appearance being that shown in Figure 10. Also the illumination from any zone which has its focus on the near side of the film, or, in other words, the majority of whose rays cross the optical axis before reaching the film, gives the opposite effect shown in Figure 11. Figure 10, therefore, represents the illumination from the condenser of Figure 6, or from the spherically correct condenser as it is ordinarily used, while Figure 11 represents the illumination from the condenser of Figure 5, or from the uncorrected type of condenser which is in most general use. Now since a ray which crosses the optical axis after reaching the film brings blue to the center of the spot, and a ray which crosses the optical axis before reaching the film plane brings red to the center of the spot, the combination of these two kinds of rays will give an illumination which is white in all its parts since "red" and "blue" are in this sense complementary colors. In Figure 12 it may be seen how the preferred form of my invention accomplishes such combination. This preferred form differs from the form shown in diagram in Figure 7 in having two zones instead of one which focus their rays beyond the film and two which focus on the near side of it. This increase in the number of zones of different curvature is necessary because the chromatic dispersion is greater in the marginal than in the central zones, and therefore if the construction is too far simplified the color introduced by the marginal zones will tend to predominate.

Aspheric surfaces being in general difficult to grind, it is desirable that the one used should be as simple as possible. To this end I have devised the type of surface shown at $S_4$ in Figure 13, also found in Figures 1 and 12. The advantage of this surface is that its generating curves are all circles. The central part of $S_4$ from the optical axis to point $j$ is spherical, having its center at $C_1$. The outer portion is part of the toric surface generated by the revolution about the optical axis of a circle having its center at $C_2$ and its radius from $C_2$ to $j$ passing through $C_1$, the circle which generates the spherical part of the surface and has its center at $C_1$ being internally tangent to the larger circle at point $j$. The line along which the two parts of the surface come together is, therefore, invisible on the finished lens, a matter of some importance where it is necessary to use the same condenser for lantern slide projection as well as motion pictures.

Keeping in mind that this converging lens must be designed with reference to the collector lens with which it is to be used, the action of the lens shown in Figure 13 is as follows: The radius of the central portion is such that rays passing through the condenser near the optical axis are focused a considerable distance beyond the film. Considering, then, in succession the points from $a$ to $p_1$, the images from them will fall farther and farther on the same side of the axis as they originated until at $p_1$ a maximum displacement is reached. Going back to Figure 8, part A shows the image through point $a$ on the lens (Figure 13 or Figure 12) and part B shows the image through point $p_1$. Returning to Figure 13; at point $p_1$ due to the positive spherical aberration which is present in the central part of the condenser the images from points farther from the optical axis on the lens begin to be displaced in the opposite direction until they cross the axis (remembering that in this discussion the images are considered only at the film plane) and reach another maximum of displacement on the other side. The point at which this takes place is $j$, the image from which falls in the position shown in Figure 8 part C. Since a further extension of the spherical surface would result in too great a decentering of the images, the toric part of the surface is started here, and, being flatter, it causes a displacement of the images in the other direction. Taking the converging lens by itself, the toric part of the surface has negative spherical aberration in rather uniform amount, but when used in combination with the spherical collector lens the rapidly increasing positive spherical aberration in the outer zones of the latter overpowers this negative spherical aberration at $p_2$, so that in the condenser as a whole the zone between $j$ and $p_2$ has negative spherical aberration and the zone from $p_2$ to the margin of the lens has positive spherical aberration. The image from point $p_2$ is displaced the maximum amount on the same side of the optical axis (Figure 8, part D) and that from the margin, $m$, is displaced the maximum amount on the opposite side of the optical axis, as shown in Figure 8 part E. The same action can be traced in Figure 12.

The surface shown at $S_4$ in Figure 13 is merely a special case of a general type of aspheric surface, other possible forms of which are shown in Figures 14, 15, and 16. It is a surface closely approaching that necessary to entirely correct spherical aberration in the condenser, with the essential difference that in some of its zones it is slightly more convex and in others slightly less convex than the perfectly correcting curve is in the same zones, so that the condenser in which it is used has positive spherical aberration in some of its zones and negative spherical aberration in the others. The dotted line curve in Figures 14, 15, and 16 shows the perfectly correcting curve and the solid line the curve required by my invention. The degree of departure from the correct curve is here necessarily much exaggerated, as in practice the departure would be scarcely more than the width of an ink line. In order to be fully efficient any of these surfaces must be constructed so that at the film plane the displacement of the rays from the position in which they would fall if the system were spherically correct is of the same amount for the zones of positive spherical aberration as for those of negative spherical aberration, and is the same for the marginal zones as for those nearer the center. This is necessary not only to prevent waste of light but also to insure evenness of color elimination. The aberrations for both illumination and color are thus complementary.

I have represented all of these aspheric surfaces as convex, but my invention could obviously be carried out in a concave surface, though this would be more difficult to grind. It might also be embodied in a system using a converging lens one surface of which would be the spherically correcting curve shown in Figures 14—16 while the other surface of the lens would carry slight undulations which would serve the same purposes as the departures from the spherically correcting curve. It might be carried out in still another way by the use of a lens having prismatic rings on one of its surfaces, some of the rings refracting the rays of light so as to make them cross the optical axis before reaching the film while the other refract them so that they cross the axis on the other side of the film plane, or part of the rays from each ring crossing the axis on each side of the film plane. One of the most desirable of the latter forms of construction is shown in Figure 17. While constructions of this type come within the scope of my invention I do not consider them desirable because of their greater complexity and the consequent difficulty of constructing them with sufficient accuracy.

It must also be observed that the special type of lens construction shown in Figure 13 is not limited to this, its simplest form, but may be elaborated into constructions, both convex and concave, in which the spherical center of the surface is surrounded by more than one toric ring, the successive toric rings being joined to each other in the same manner as the outer ring of the lens of Figure 13 is joined to the spherical center. These constructions allow of a much closer approximation of spherical correctness than is desirable for my present purpose, but they may be applied to other uses such as, for example, searchlight lenses.

Inasmuch as the spacing of the lenses enters into the corrections of my condenser system, I prefer to use the lenses in a holder of the type shown in section in Figure 1. This holder not only provides a fixed and accurate separation of the lenses but also acts as a heat absorber and reservoir, thereby protecting the lenses from breakage by the sudden changes in temperature to which they are subjected in use.

This application is a re-filing of my application No. 684,391, filed January 4, 1924.

I claim:

1. A condenser lens comprising a series of zones having progressively different refractive powers, the said differences of refractive powers being of such magnitude as to produce different focal lengths for the several zones, and the difference of the said focal lengths being of the same order of magnitude as the difference between the focal lengths for the several components of white light for any one zone, whereby the several components of white light from the several zones overlap within a predetermined area to produce white light.

2. A condenser lens comprising a series of zones having progressively different refractive powers, the said differences of refractive powers being of such magnitude as to produce different focal lengths for the several zones, and the difference of the said focal lengths being of the same order of magnitude as the differences of focal length due to spherical aberration in any one zone and of the same order of magnitude as the difference between the focal lengths for the several components of white light for any one zone, whereby the several components of white light from the several zones overlap within a predetermined area to produce white light of uniform intensity.

3. A condenser lens comprising a series of zones having progressively different refractive powers, the said differences of refractive powers being of such magnitude as to produce different focal lengths for the several zones, and the difference of the said focal lengths being of the same order of magnitude as the differences of focal length due to spherical aberration in any one zone and of the same order of magnitude as the difference between the focal lengths for the several components of white light for any one zone, the areas of the said zones being such that the effect of the said different refractions will be complementary in quantity, whereby a uniform illumination of uniform color will be produced over a predetermined area.

4. A condenser for a light projector having a lens section, said section having a front face a back face, each of said faces consisting of a surface from the center to the rim of the said lens, the degree of curvature of one of the faces changing progressively from the center to the rim through a series of zones having different degrees of curvature, the said differences of curvature being of such magnitude as to produce different focal lengths for the several zones and the difference of the said focal lengths being of the same order of magnitude as the difference between the focal lengths for the several components of white light for any one zone.

5. A condenser for a light projector having a lens suction, said section having a front face and a back face each of said faces consisting of a surface from the center to the rim of the said lens, the degree of curvature of one of the faces changing progressively from the center to the rim through a series of zones having different degrees of curvature, the said differences of curvature being of such magnitude as to produce different focal lengths for the several zones and the difference of the said focal lengths being of the same order of magnitude as the difference between the focal lengths for the several components of white light for any one zone, whereby the chromatic aberration in the several zones is equal in amount and opposite in direction at the focal point.

JOHN A. MAURER, Jr.